United States Patent
Ishii

Patent Number: 5,887,263
Date of Patent: Mar. 23, 1999

[54] MOBILE COMMUNICATION SYSTEM USING TWO CHANNEL ASSIGNING SCHEMES

[75] Inventor: Kenichi Ishii, Tokyo, Japan

[73] Assignee: NEC Corporation, Japan

[21] Appl. No.: 804,492

[22] Filed: Feb. 21, 1997

[30] Foreign Application Priority Data

Feb. 26, 1996 [JP] Japan ................... 8-037956

[51] Int. Cl.$^6$ .................................. H04Q 7/20
[52] U.S. Cl. .................. 455/452; 455/512; 455/63
[58] Field of Search .................. 455/450, 452, 455/453, 509, 513, 524, 517, 512, 63

[56] References Cited

FOREIGN PATENT DOCUMENTS 4-351126  12/1992  Japan .

OTHER PUBLICATIONS

"Mobile Cellular Telecommunications Systems", McGraw–Hill Book, pp. 259 –261, 1989.
"Autonomous Reuse Partitioning in Cellular Systems", Conference Record of 42nd IEEE VTC, Feb. 1992, pp. 782 –785.
"Channel Segregation, a Distributed Adaptive Channel Allocation Scheme for Mobile Communication Systems", IEICE Transactions, vol. E 74, No. 6, Jun. 1991, pp. 1531 –1537.

*Primary Examiner*—Edward F. Urban
*Assistant Examiner*—Seid Raju
*Attorney, Agent, or Firm*—Ostrolenk, Faber, Gerb & Soffen, LLP

[57] ABSTRACT

A mobile communication system includes base stations, mobile stations, first and second channel assigning section, and a channel ratio changing section. The base stations are installed in correspondence with cells constituting a service area. Each mobile station performs communication with the base station through one channel selected from the channels classified into first and second groups. The first channel assigning section uses a channel segregation scheme of controlling the priority of a channel set in each of the base stations on the basis of carrier to interference ratios of a channel belonging to the first group, measured at both the mobile station and the base station, and selects/assigns one idle channel in the first group on the basis of the controlled priority. The second channel assigning section uses an ARP scheme of selecting/assigning one idle channel in the second group according to a priority common to all the cells on the basis of carrier to interference ratios of a channel belonging to the second group, measured at both the mobile station and the base station. The channel ratio changing section changes the ratio of the number of channels belonging to the first group to that of channels belonging to the second group on the basis of channel assignment results.

12 Claims, 7 Drawing Sheets

MOBILE COMMUNICATION SYSTEM USING TWO CHANNEL ASSIGNING SCHEMES

BACKGROUND OF THE INVENTION

The present invention relates to a mobile communication system such as an automobile telephone system or portable telephone system and, more particularly, to a mobile communication system characterized by channel assignment based on cellular channel assignment.

In a mobile communication system such as an automobile telephone system or portable telephone system, the service area is generally covered by a plurality of base stations. In this case, in assigning frequencies to base stations which cause no interference, the same frequency as that used in one base station is repeatedly assigned to the other base station, thereby realizing efficient use of frequencies. Such a scheme is called a cellular scheme.

Channel assignment schemes which are used in each base station when the cellular scheme is employed are roughly categorized into two schemes. The first scheme is called a fixed channel assignment scheme. In this scheme, on the basis of the estimation result of the propagation characteristics of signals, channels to be used in each base station are permanently fixed thereto in advance so as to prevent interference. The fixed channel assignment scheme is generally used in the current automobile telephone or portable telephone system.

The second scheme is called a dynamic channel assignment scheme. In the dynamic channel assignment scheme, a channel on which no interference occurs is selected and used for each communication. With the use of the dynamic channel assignment method, although the method and apparatus arrangement for channel assignment are complicated, all channels can be used as long as no interference occurs. The dynamic channel assignment scheme is therefore larger in traffic handling capacity than the fixed channel assignment scheme. Owing to such an advantage, attempts have been made to use the dynamic channel assignment scheme in an automobile telephone or portable telephone system and an outdoor cordless telephone system which will be commercially available in the future.

The repetition distance of a radio channel in the fixed channel assignment scheme is determined on the basis of the carrier to interference (C/I) ratio at the boundary between cells. Since the power of a desired carrier is high near the center of the cell, a radio channel can be used at a shorter repetition distance than near the boundary between the cells.

The following technique has therefore been proposed. The cell is divided into small annular cells in accordance with the distance from the base station. The reuse distance of a channel assigned to a small cell near the base station is set to be shorter than that of a channel assigned to a small cell remote from the base station, thereby increasing the frequency utilization efficiency. This technique is called reuse partitioning and disclosed in William C. Y. Lee, "Mobile Cellular Telecommunications Systems", McGraw-Hill Book, pp. 259–261, 1989.

With regards to the dynamic channel assignment scheme, various algorithms for selecting communication channels have been proposed. Of these proposals, a scheme called ARP (Autonomous Reuse Partitioning) is known, which can dynamically realize reuse partitioning without performing complicated control, and allows high frequency utilization efficiency. ARP is described in Japanese Patent Laid-Open No. 4-351126 and Toshihiro Kanai, "Autonomous Reuse Partitioning in Cellular Systems", Conference Record of 42nd IEEE VTC, February 1992, pp. 782–785.

In this ARP scheme, when a speech communication request (to be referred to as a call hereinafter) is transmitted from or to a mobile station in a cell, a base station belonging to the cell measures the C/I ratios of each idle channel at both the base station and the mobile station in the order commonly set for all the cells. The base station then assigns the first channel on which this C/I ratio exceeds the first level as a predetermined value for communication. With the use of this technique, the distances between base stations and mobile stations using identical channels are made almost equal, thus dynamically performing reuse partitioning. With this operation, the reuse distances of identical channels can be decreased to increase the frequency utilization efficiency.

As a dynamic channel assignment scheme, a channel segregation scheme has also been proposed. In this scheme, each base station assigns a priority to each channel, and increases/decreases the priority of each channel on the basis of the measurement result of the I/C ratio thereof. The channels are selected in the order of decreasing priorities. The channel segregation scheme is disclosed in Yukitsuna Furuya and Yoshihiko Akaiwa, "Channel Segregation, a Distributed Adaptive Channel Allocation Scheme for Mobile Communication Systems", IEICE Transactions, vol. E 74, No. 6, June 1991, pp. 1531–1537. According to the scheme, in a cell, each base station learns about a channel resistant to interference from the past utilized states of channels. Since the channel resistant to interference is preferentially used, the occurrence probability of interference (interference probability) can be decreased.

According to the ARP scheme as a dynamic channel assignment scheme, as described above, reuse partitioning is dynamically performed to decrease the reuse distances of identical channels, thereby increasing the frequency utilization efficiency. However, the C/I ratio of a channel assigned by the ARP scheme exhibits a small margin with respect to the first level. For this reason, the number of times of channel handoff (to be referred to as the number of times of interference) during speech communication increases owing to the influences of interference, and the number of times forced termination of speech communication (to be referred to as forced disconnection) increases owing to channel handoff failures.

According to the channel segregation scheme, the priority of a channel frequently used in a given base station increases by learning, but the priority of the identical channel in an adjoining base station decreases. As a result, the frequency of using the identical channel in the adjoining base station decreases to decrease the number of times of interference. However, since the reuse distance of the identical channel increases, the frequency utilization efficiency decreases.

SUMMARY OF THE INVENTION

It is the first object of the present invention to provide a cellular mobile communication system which exhibits high frequency utilization efficiency and excellent interference characteristics associated with the number of times of interference, forced disconnection, and the like.

It is the second object of the present invention to provide a mobile communication system which exhibits good interference characteristics and can preferentially assign a channel with good communication quality.

In order to achieve the above objects, according to the present invention, there is provided a mobile communication system comprising a plurality of base stations installed in correspondence with cells constituting a service area, a mobile station for performing communication with the base station through one channel selected from a plurality of channels classified into first and second groups, first channel assigning means using a channel segregation scheme of controlling a priority of a channel set in each of the base stations, on the basis of carrier to interference ratios of a channel belonging to the first group, which are measured at both the mobile station and the base station, and selecting and assigning one idle channel in the first group on the basis of the controlled priority, second channel assigning means using an ARP scheme of selecting and assigning one idle channel in the second group according to a priority common to all the cells on the basis of carrier to interference ratios of a channel belonging to the second group which are measured at both the mobile station and the base station, and channel ratio changing means for changing a ratio of the number of channels belonging to the first group to that of channels belonging to the second group on the basis of channel assignment results obtained by the first and second channel assigning means.

DESCRIPTION OF THE PREFERRED EMBODIMENTS

The present invention will be described in detail below with reference to the accompanying drawings.

Figure 1:
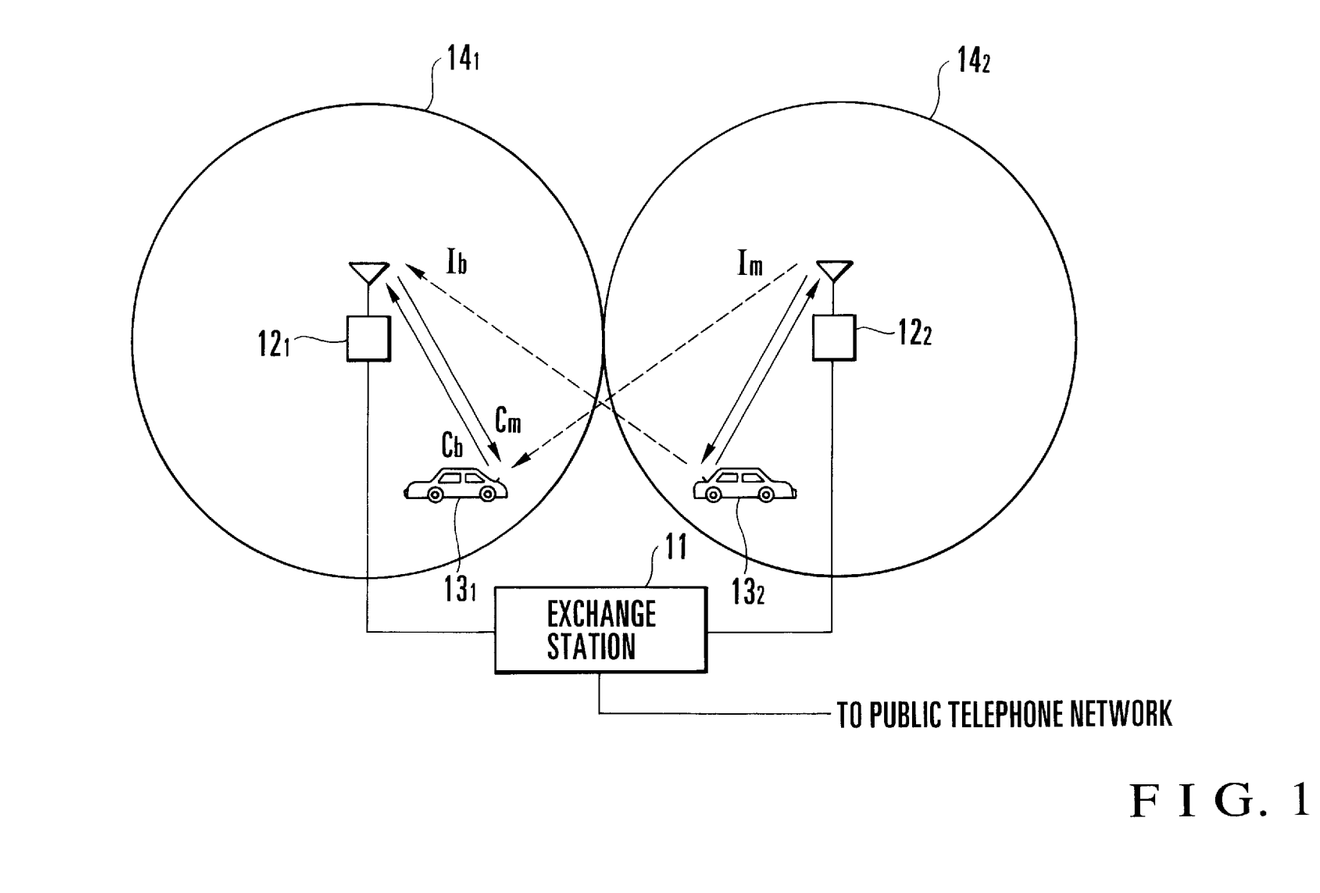
FIG. 1 is a block diagram showing the schematic arrangement of a mobile communication system according to the present invention.

FIG. 1 shows the schematic arrangement of a mobile communication system according to the present invention. The mobile communication system in FIG. 1 is constituted by an exchange station 11, first and second base stations $12_1$ and $12_2$, and first and second mobile stations $13_1$ and $13_2$. The first base station $12_1$ is provided for a first cell $14_1$. The second base station $12_2$ is provided for the second cell $14_2$. The incoming desired wave level from the first mobile station $13_1$ at the first base station $12_1$ is represented by Cb, and the outgoing desired wave level from the first base station $12_1$ at the first mobile station $13_1$ is represented by Cm. The incoming interference wave level from the second mobile station $13_2$ at the first base station $12_1$ is represented by Ib, and the outgoing interference wave level from the second base station $12_2$ at the first mobile station $13_1$ is represented by Im. Each level is expressed in dB.

When the first mobile station $13_1$ present in the first cell $14_1$ generates a call, a talking channel on which an incoming carrier to interference ratio Cb/Ib at the first base station $12_1$ and an outgoing carrier to interference ratio Cm/Im at the first mobile station $13_1$ are equal to or larger than predetermined values, respectively, is selected and used.

In the following description, the fact that a given channel can be assigned to a given mobile station means that the channel is not used in any other mobile stations in the cell, and the C/I ratios at both the base station and the mobile station are equal to or larger than the predetermined values. In this embodiment, the total number of channels is N. Of these channels, first to Mth channels $CH_1$ to $CH_M$ belong the first group, and the remaining channels, i.e., (M+1)th to Nth channels $CH_{(M+1)}$ to $CH_N$ belong to the second group. The channel segregation scheme exhibiting excellent interference characteristics is used for the first group, whereas the ARP scheme exhibiting high frequency utilization efficiency is used for the second group. The ith channel CHi will be referred to as a channel P(i) in terms of the priority order in each cell. The jth channel CHi will be referred to as a channel Q(j) in terms of the priority order common to all the cells. The channel p(i) is updated on the basis of the interference wave power measured periodically.

Figure 9:
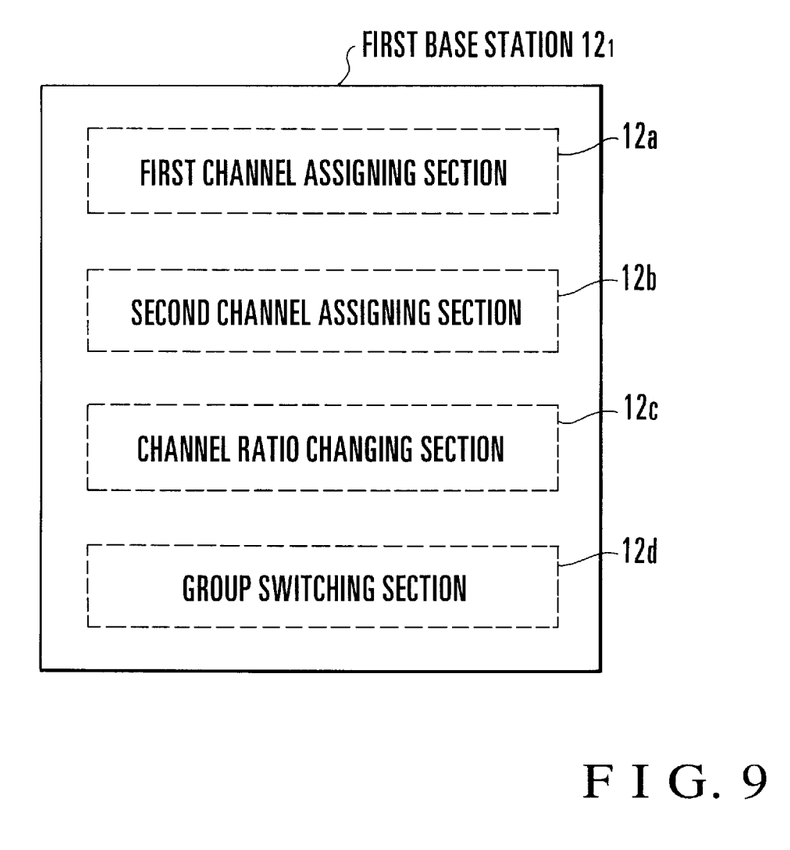
FIG. 9 is a block diagram showing the functions of a base station in FIG. 1.

Each of the base stations $12_1$ and $12_2$ in FIG. 1 includes a CPU (Central Processing Unit) (not shown) for performing channel assignment control and other control operations. Each CPU performs these control operations by using programs stored in a storage medium such as a ROM (Read-Only Memory) or magnetic disk (not shown). FIG. 9 shows the functions of the CPU in the first base station $12_1$. Reference numeral 12a denotes a first channel assigning section for assigning a channel belonging to the first group; 12b, a second channel assigning section for assigning a channel belonging to the second group; 12c, a channel ratio changing section for changing the ratio of the number of channels of the first group to that of the second group; and 12d, a group switching section for switching between channel assignment using the first group and channel assignment using the second group, i.e., switching between the operations of the first and second channel assigning sections.

Figure 2:
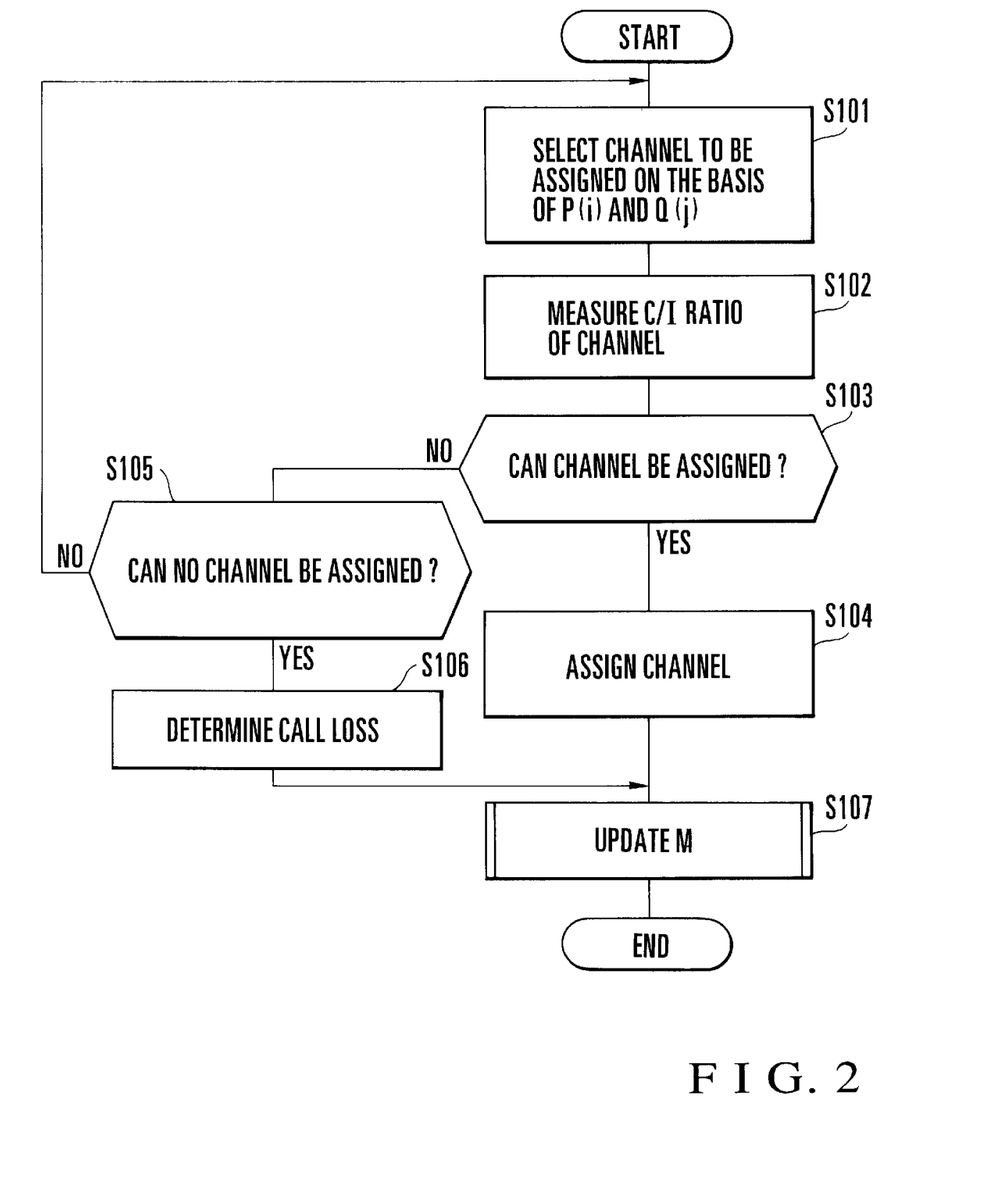
FIG. 2 is a flow chart showing an outline of channel assignment control in the mobile communication system in FIG. 1.

FIG. 2 shows an outline of the flow of control for channel assignment in this embodiment. Each of the stations $12_1$ and $12_2$ selects the channel P(i) based on the first priority order or the channel Q(i) based on the second priority order in accordance with a predetermined check sequence from all the channels $CH_1$ to $CH_N$ belonging to the first and second groups (step S101). The C/I ratio of the selected channel is measured (step S102). It is checked whether the channel can be assigned (step S103). If it is determined that the channel can be assigned, the channel is immediately assigned (step S104).

If it is determined in step S103 that the channel cannot be assigned, it is checked whether all the channels cannot be assigned (step S105). If it is determined in step S105 that another channel can be selected, the flow returns to step S101 to select this channel. In this manner, while the selected channel cannot be assigned, steps S102 to S105 are repeated to check the possibility of channel assignment until it is determined that a channel can be assigned.

If it is determined in step S103 that the channel can be assigned, the channel is assigned in step S104, as described above. Subsequently, a value M is updated to change the ratio of the number of channels of the first group to that of the second group (step S107) in accordance with the channel assignment result. The processing is then terminated.

If it is determined step S105 that no channel can be assigned, a call loss is determined (step S106). In this case, the value M is updated in step S107, and the processing is terminated.

Figure 3:
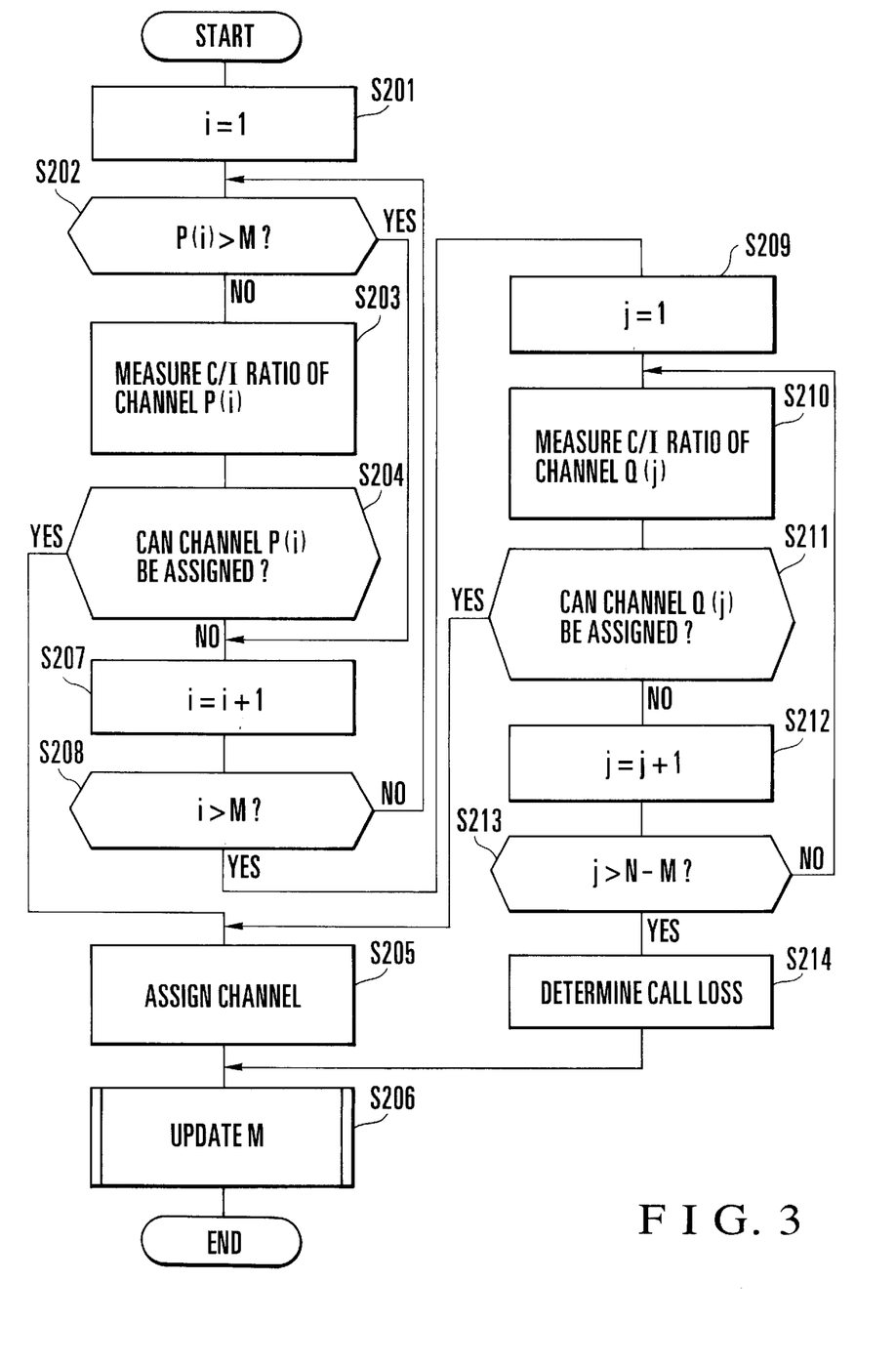
FIG. 3 is a flow chart showing channel assignment control to be performed when a call is generated as a speech communication request according to the first embodiment of the present invention.

A channel assignment control operation to be performed when a call is generated as a speech communication request will be described next with reference to the flow chart of FIG. 3. The first channel assigning section 12a in each of the base stations $12_1$ and $12_2$ selects a channel P(1) having the highest priority in the first priority order among the channels belonging to the first group (step S201). It is then checked whether this channel P(1) falls within the channel number range of the first group (step S202). If it is determined that the channel falls within the channel number range of the first group, the C/I ratio of the channel P(1) is measured (step S203). It is then checked whether the channel P(1) can be assigned (step S204). If it is determined in step S204 that the channel P(1) can be assigned, the channel is assigned (step S205). Thereafter, the value M is updated by the channel ratio changing section 12c (step S206), as will be described later. The processing is then terminated.

If it is determined in step S204 that the channel P(1) cannot be assigned, the value of the symbol "i" is incremented by "1" to become "2" (step S207). It is checked whether the incremented value of the symbol "i" is larger than the value M (step S208). If NO in step S208, i.e., the channel P(1) belongs to the first group, the flow returns to step S202 to perform the same processing as described above. In this manner, the value of the symbol "i" is incremented one by one while the channel P(i) cannot be assigned. If it is determined in step S208 that the value of the symbol "i" becomes larger than the value M, it is determined that there is no channel in the first group which can be assigned.

In this case, the group switching section 12d starts the second channel assigning section 12b. The second channel assigning section 12b sets the value of the symbol "j" to "1" (step S209), and starts channel assignment using the second group. The C/I ratio of a channel Q(1) is then measured (step S210). It is checked whether the channel can be assigned (step S211). If it is determined in step S211 that the channel Q(1) can be assigned, the flow advances to step S205 described above.

If it is determined in step S211 that the channel Q(1) cannot be assigned, the value of the symbol "j" is incremented by "1" (step S212). It is checked whether the incremented value of the symbol "j" is larger than the number (N–M) of channels belonging to the second group (step S213). If NO in step S213, the flow returns to step S210 to measure the C/I ratio of the channel Q(j). In this manner, while the value of the symbol "j" is incremented one by one, it is checked in step S211 whether the channel Q(j) can be assigned. If it is determined in step S211 that the channel can be assigned, the flow advances to step S205.

If it is determined in step S213 that no channel Q(j) can be assigned, a call loss is determined (step S214). In this case as well, the channel ratio changing section 12c updates the value M for classifying the channels into the first and second groups (step S206). Thereafter, the processing is terminated.

As described above, in this embodiment, when a call is generated, the channel segregation scheme is used first to search the first group for a channel which can be assigned.

With this operation, a channel exhibiting good interference characteristics and good speech communication quality can be preferentially assigned.

Update control for the value M in step S206 (FIG. 3) corresponding to step S107 (FIG. 2) may be performed differently depending on the application purpose of the system. Two types of update control operations performed by the channel ratio changing section 12c will be described below.

Figure 4:
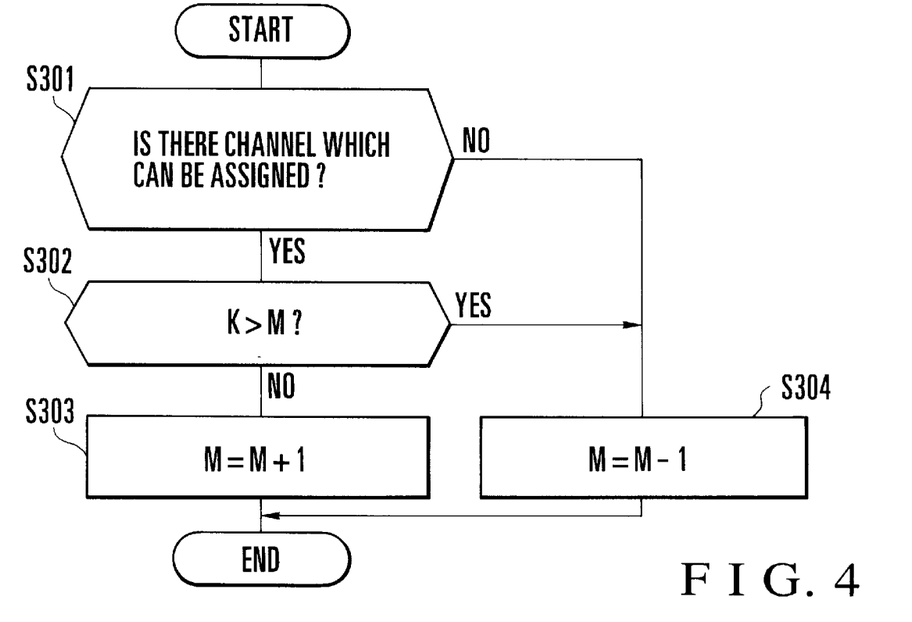
FIG. 4 is a flow chart showing the first example of the update step for a value M in FIG. 3.

FIG. 4 shows an update control operation based on the assumption that a channel belonging to the first group is assigned according to the channel segregation scheme because the communication traffic is low.

According to the update control shown in FIG. 4, it is checked whether there is a channel which can be assigned (step S301). If it is determined in step S204 or S211 in FIG. 3 that channel assignment can be performed, it is determined that there is a channel which can be assigned. In this case, it is checked whether a value K is larger than the value M (step S302). In this case, the value K corresponds to the channel number of the assigned channel. If, for example, YES is obtained in step S204, i.e., the channel P(i) can be assigned, NO is obtained in step S302. If it is determined in step S211 that the channel Q(j) can be assigned, YES is obtained in step S302.

If NO in step S302, it is determined that there is a channel in the first group which can be assigned. Since the channel segregation scheme is used for the channels belonging to the first group, it indicates that the communication traffic is low. For this reason, the value M is incremented by "1" to increase the number of channels belonging to the first group based on the channel segregation scheme exhibiting good interference characteristics and good speech communication quality (step S303). The processing is then terminated.

If YES is obtained in step S302, i.e., the value K is larger than the value M, and it is determined in step S301 that there is no channel which can be assigned, the value M is decremented by "1" to decrease the number of channels belonging to the first group (step S304). The processing is then terminated.

With this operation, high speech communication quality can be obtained, while high frequency utilization efficiency is maintained, in accordance with variations in communication traffic.

Figure 5:
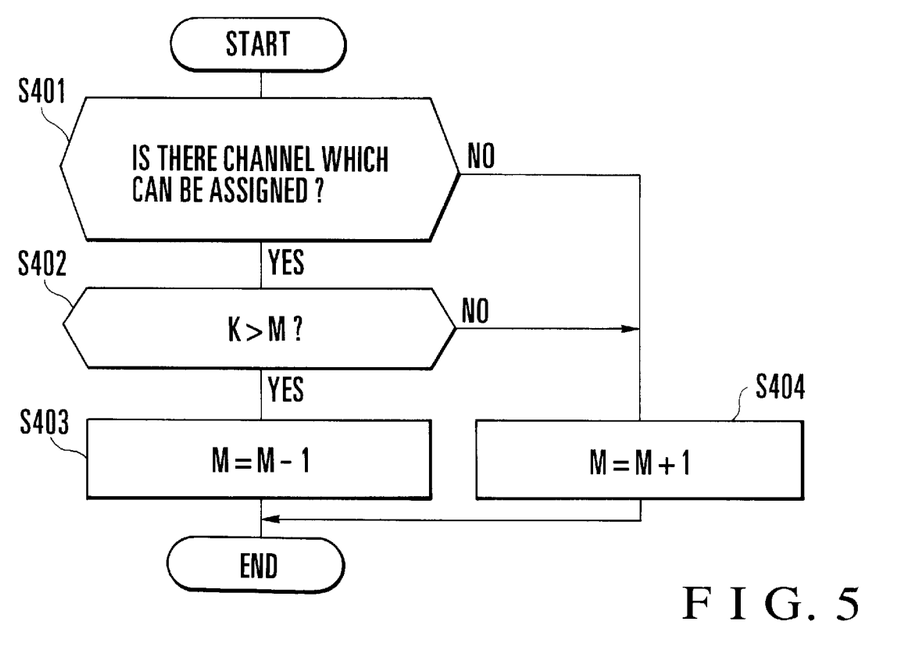
FIG. 5 is a flow chart showing the second example of the update step for the value M in FIG. 3.

FIG. 5 shows an update control operation based on the assumption that a channel belonging to the second group is assigned according to the ARP scheme because the communication traffic is high.

In this case as well, it is checked first whether there is a channel which can be assigned (step S401). If YES in step S401, it is checked whether the value K is larger than the value M, i.e., there is a channel in the second group which can be assigned (step S402). If it is determined in step S402 that the channel is present in the second group, it indicates that the communication traffic is high. In this case, therefore, the ARP scheme exhibiting high frequency utilization efficiency is preferably used. In order to increase the number of channels belonging to the second group based on the ARP scheme, the value M is decremented by "1" (step S403). If it is determined in step S401 that there is no channel which can be assigned, and it is determined in step S402 that the channel is present in the first group, the value M is incremented by "1" for the opposite reason (step S404).

With this operation, high speech communication quality can be obtained, while high frequency utilization efficiency is maintained, in accordance with variations in communication traffic.

Figure 6:
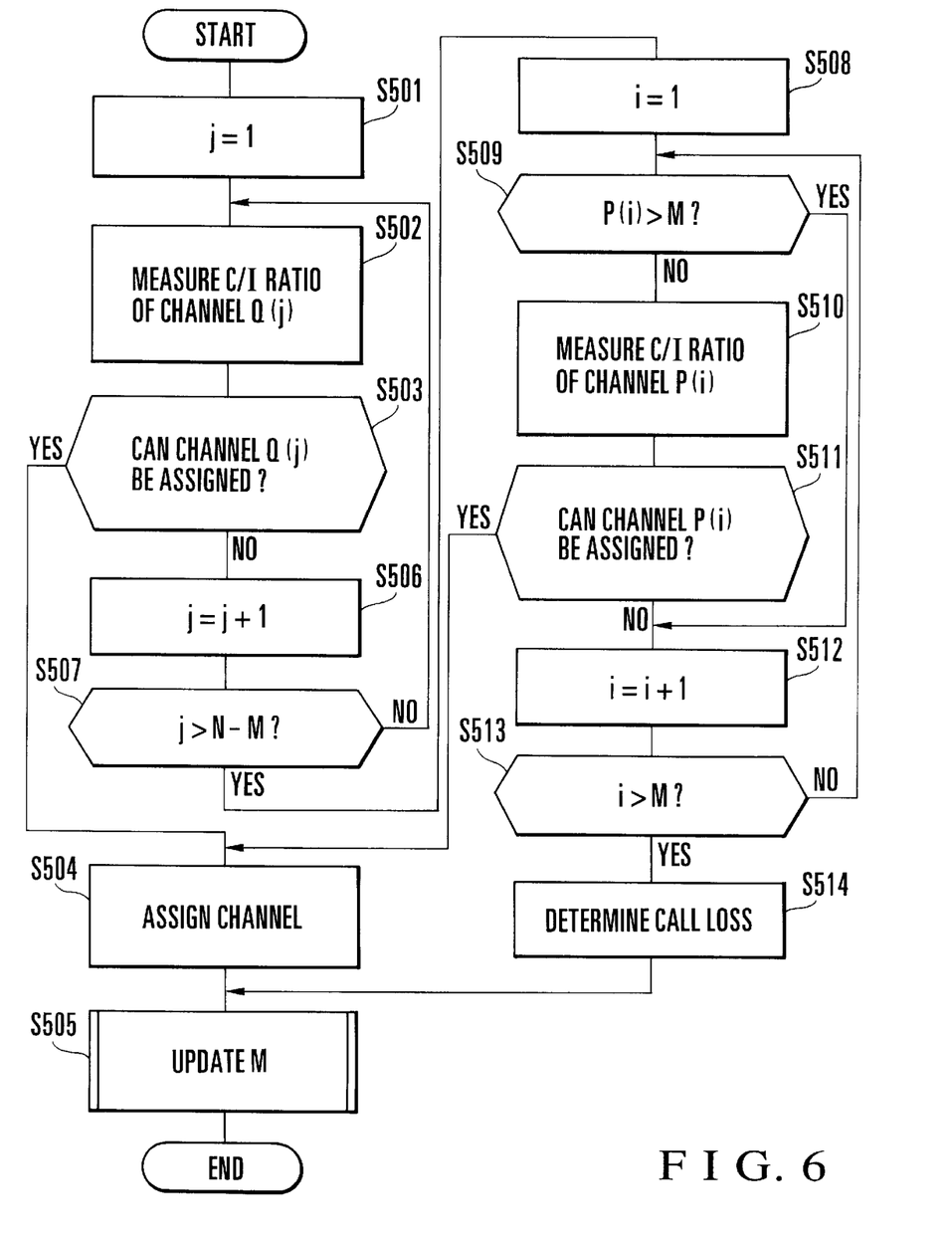
FIG. 6 is a flow chart showing channel assignment control to be performed when a call is generated as a speech communication request according to the second embodiment of the present invention.

Channel assignment control according to another embodiment which is to be performed when a call is generated as a speech communication request will be described next with reference to the flow chart of FIG. 6. A second channel assigning section 12b of each of base stations $12_1$ and $12_2$ sets the value of the symbol "j" to "1", and selects a channel Q(1) having the highest priority in the second priority order among the channels belonging to the second group (step S501). The C/I ratio of the channel Q(1) is measured (step S502). It is then checked whether the channel Q(1) can be assigned (step S503). If it is determined in step S503 that the channel Q(1) can be assigned, the channel is assigned (step S504). The value M is updated (step S505). The processing is then terminated. The update processing for the value M which is performed by a channel ratio changing section 12c will be described later.

If it is determined in step S503 that the channel Q(1) cannot be assigned, the value of the symbol "j" is incremented by "1" to become "2" (step S506). It is then checked whether the incremented value of the symbol "j" is larger than the number (N−M) of channels belonging to the second group (step S507). If NO in step S507, the flow returns to step S502 to perform the above processing. In this manner, the value of the symbol "j" is incremented one by one while the channel Q(j) cannot be assigned. If it is determined in step S507 that the value of the symbol "j" becomes larger than the value of "N−M", it indicates that there is a channel in the second group which can be assigned.

In order to select a channel from the first group, a group switching section 12d starts a first channel assigning section 12a. The first channel assigning section 12a sets the value of the symbol "i" to "1" (step S508), and checks whether the channel number of the channel P(1) is larger than the value M (step S509). If it is determined in step S509 that the channel number of the channel P(1) is larger than the value M, the C/I ratio of the channel P(i) is measured (step S510). It is then checked whether the channel can be assigned (step S511). If it is determined in step S511 that the channel can be assigned, the flow advances to step S504 described above.

If it is determined in step S509 that the channel number of the channel P(i) is larger than the value M, and it is determined in step S511 that the channel P(i) cannot be assigned, the value of the symbol "i" is incremented by "1" (step S512). Subsequently, it is checked whether the incremented value of the symbol "i" is larger than the value M (step S513). If YES in step S513, the flow returns to step S509 to repeat the control operation in steps S509 to S513. In this control process, if it is determined in step S511 that the channel P(i) can be assigned, the flow advances to step S504 to assign the channel.

If it is determined in step S513 that channel assignment cannot be performed using not only the second group but also the first group, a call loss is determined (step S514). In this case as well, the value M is updated by the channel ratio changing section 12c in step S505, and the processing is terminated.

Update control for the value M in step S505 (FIG. 6) corresponding to step S107 (FIG. 2) may be performed differently depending on the application purpose of the system. Two types of update control operations performed by the channel ratio changing section 12c will be described below.

Figure 7:
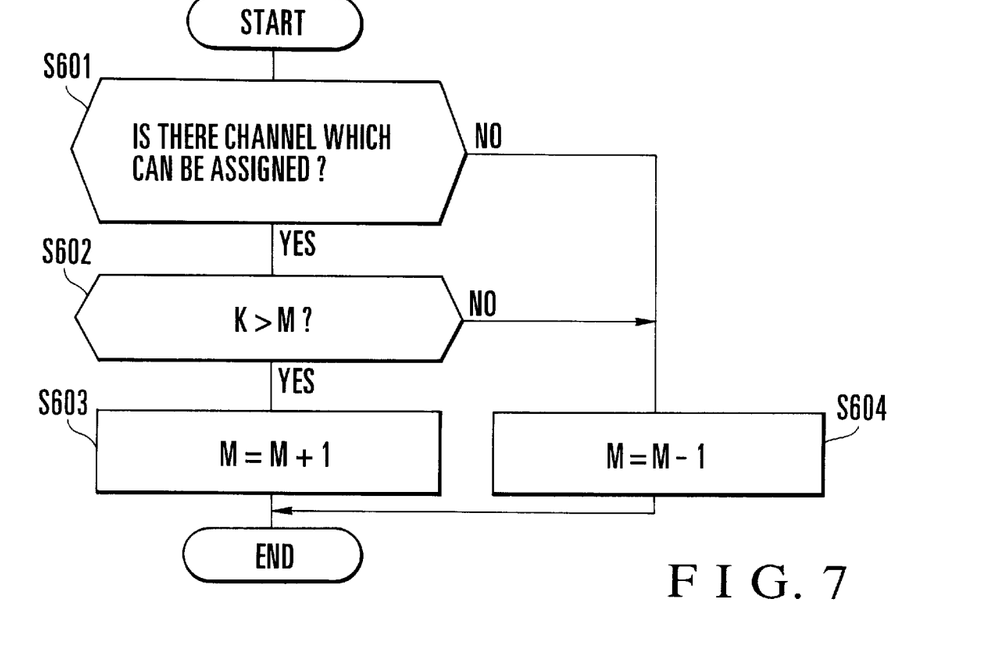
FIG. 7 is a flow chart showing the first example of the update step for a value M in FIG. 6.

FIG. 7 shows an update control operation based on the assumption that a channel belonging to the second group is assigned according to the APR scheme because the frequency utilization efficiency in the system is sufficiently high. In this case as well, it is checked first whether there is a channel which can be assigned (step S601). If YES in step S601, it is checked whether the value K is larger than the value M, i.e., there is a channel in the second group which can be assigned (step S602). If YES in step S602, it indicates that the frequency utilization efficiency is sufficiently high. For this reason, the value M is incremented by "1" to increase the number of channels belonging to the first group based on the channel segregation scheme exhibiting good interference characteristics and good speech communication quality (step S603). If NO in steps S601 and S602, the value M is decremented by "1" for the opposite reason (step S604).

With this operation, high speech communication quality can be obtained, while high frequency utilization efficiency is maintained, in accordance with variations in communication traffic.

Figure 8:
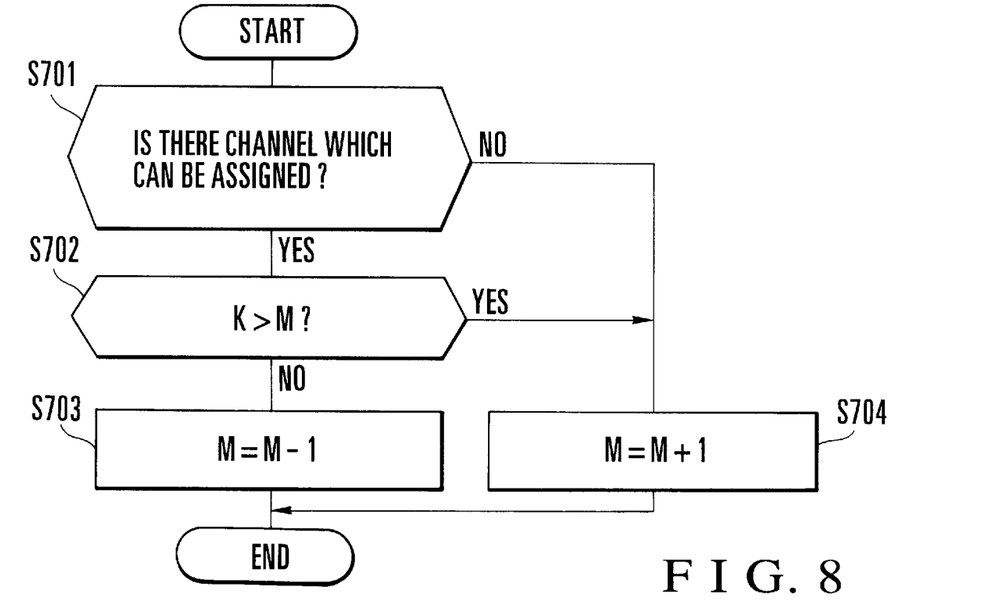
FIG. 8 is a flow chart showing the second example of the update step for the value M in FIG. 6.

FIG. 8 shows an update control operation based on the assumption that a channel belonging to the first group is assigned according to the channel segregation scheme after assignment control using the second group because the communication traffic is low.

In this case as well, it is checked first whether there is a channel which can be assigned (step S701). If YES in step S701, it is checked whether the value K is larger than the value M, i.e., there is a channel in the first group which can be assigned (step S702). If NO in step S702, i.e., the channel is present in the first group, it indicates that the communication traffic is low. For this reason, the ARP scheme exhibiting high frequency utilization efficiency is preferably used. The value M is therefore decremented by "1" to increase the number of channels belonging to the second group based on the ARP scheme (step S703). If NO in step S701 and YES in step S702, the value M is incremented by "1" for the opposite reason (step S704).

With this operation, high speech communication quality can be obtained, while high frequency utilization efficiency is maintained, in accordance with variations in communication traffic.

As has been described above, according to the present invention, all the channels for communication are classified into the first and second groups. Channel assignment using the first group is performed by the channel segregation scheme of the dynamic channel assignment schemes, whereas channel assignment using the second group is performed by the ARP scheme of the dynamic channel assignment schemes. An attempt is then made to assign a channel belonging to either the first group or the second group. The number of channels belonging to each group is dynamically changed on the basis of the assignment result, i.e., that the assigned channel belongs to the first or second group or no channel can be assigned. Even if, therefore, the communication traffic varies, the average service quality can be kept higher by the above technique than by the technique of using the channel segregation scheme or the ARP scheme alone.

What is claimed is:

1. A mobile communication system comprising:
   a plurality of base stations installed in correspondence with cells constituting a service area;
   a mobile station for performing communication with said base station through one channel selected from a plurality of channels classified into first and second groups;
   first channel assigning means using a channel segregation scheme of controlling a priority of a channel set in each of said base stations, on the basis of carrier to interference ratios of a channel belonging to the first group, which are measured at both said mobile station and said base station, and selecting and assigning one idle channel in the first group on the basis of the controlled priority;

second channel assigning means using an Autonomous Reyse Partitioning scheme of selecting and assigning one idle channel in the second group according to a priority common to all the cells on the basis of carrier to interference ratios of a channel belonging to the second group which are measured at both said mobile station and said base station; and channel ratio changing means for changing a ratio of the number of channels belonging to the first group to that of channels belonging to the second group on the basis of channel assignment results obtained by said first and second channel assigning means.

2. A system according to claim 1, further comprising group switching means for, when a call is generated, starting said first channel assigning means to search the first group for one of idle channels which can be assigned, and when there is no channel in the first group which can be assigned, starting said second channel assigning means to search the second group for one of idle channels which can be assigned.

3. A system according to claim 2, wherein said channel ratio changing means increases the number of channels belonging to the first group when an assigned channel belongs to the first group.

4. A system according to claim 3, wherein said channel ratio changing means increases the number of channels belonging to the second group when an assigned channel belongs to the second group and there is no channel which can be assigned.

5. A system according to claim 2, wherein said channel ratio changing means increases the number of channels belonging to the second group when an assigned channel belongs to the second group.

6. A system according to claim 5, wherein said channel ratio changing means increases the number of channels belonging to the first group when an assigned channel belongs to the first group and there is no channel which can be assigned.

7. A system according to claim 1, further comprising group switching means for, when a call is generated, starting said second channel assigning means to search the second group for one of idle channels which can be assigned, and when there is no channel in the second group which can be assigned, starting said first channel assigning means to search the first group for one of idle channels which can be assigned.

8. A system according to claim 7, wherein said channel ratio changing means increases the number of channels belonging to the first group when an assigned channel belongs to the second group.

9. A system according to claim 8, wherein said channel ratio changing means increases the number of channels belonging to the second group when an assigned channel belongs to the first group and there is no channel which can be assigned.

10. A system according to claim 7, wherein said channel ratio changing means increases the number of channels belonging to the second group when an assigned channel belongs to the first group.

11. A system according to claim 10, wherein said channel ratio changing means increases the number of channels belonging to the first group when an assigned channel belongs to the second group and there is no channel which can be assigned.

12. A system according to claim 1, wherein each of said base stations comprises said first and second channel assigning means and said channel ratio changing means.

* * * * *